Figure 5:
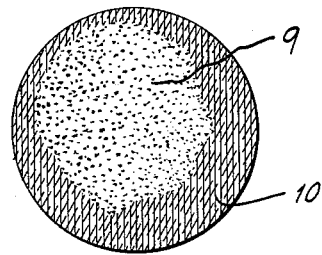

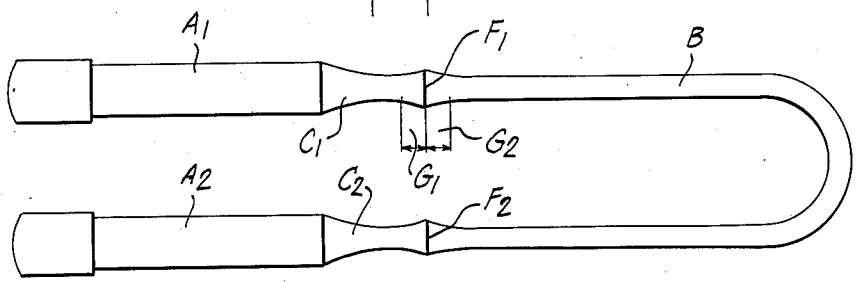
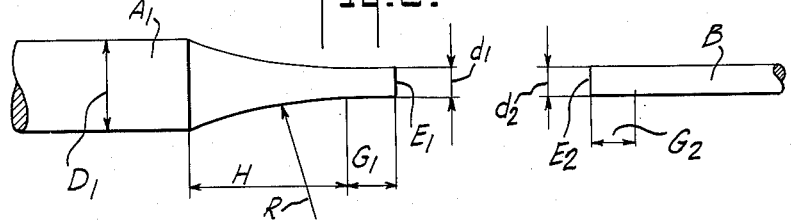
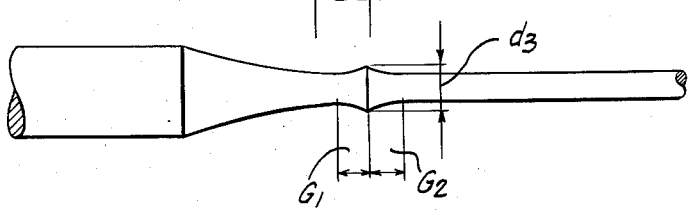
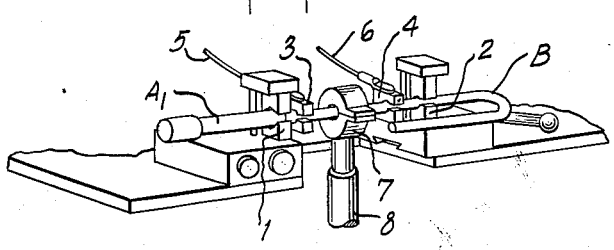

July 18, 1961 N. G. SCHREWELIUS ET AL 2,993,111
MANUFACTURE OF ELECTRIC RESISTANCE ELEMENTS
Filed April 9, 1958 4 Sheets-Sheet 2

INVENTORS
NILS GUSTAV SCHREWELIUS
BY STYRBJÖRN AMBERG
Kenyon & Kenyon
ATTORNEYS

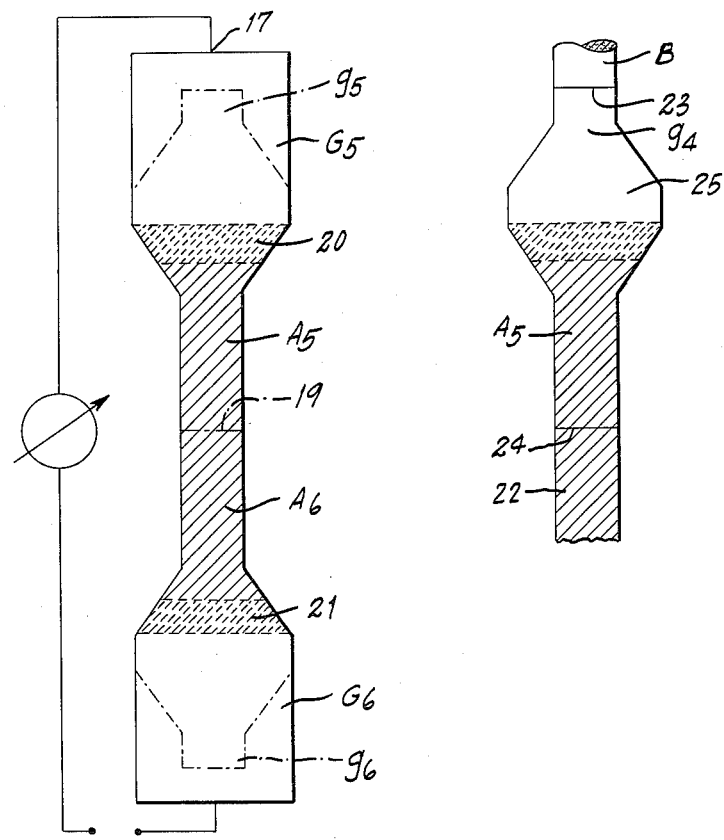

United States Patent Office 2,993,111
Patented July 18, 1961

2,993,111
MANUFACTURE OF ELECTRIC RESISTANCE ELEMENTS

Nils Gustav Schrewelius and Styrbjörn Amberg, Hallstahammar, Sweden, assignors to Aktiebolaget Kanthal, Hallstahammar, Sweden
Filed Apr. 9, 1958, Ser. No. 737,467
Claims priority, application Sweden Apr. 12, 1957
22 Claims. (Cl. 219—118)

It is known heretofore to butt weld materials in which the basic substance itself is plastically deformable, or ductile, at the temperature necessary to carry out the butt welding operation, as is the case with metals, for example. The characteristic feature in this case resides in that, when the sintering or fusing together is taking place, the actual deformation occurs within the crystal grains, whereby the application of the butt welding method comes quite natural. Further, it is known to be possible in a graphite mold with application of pressure and using externally supplied heat, to sinter together bodies consisting of a material such that plastic deformation cannot be expected to take place within the crystal grains of the basic substance at the temperature at which the sintering operation takes place. In this case the plastic deformation of the material is effected by the crystal grains of the basic substance being displaced in sliding contact with each other, which may be attained only by causing the sintering together to take place under pressure.

The present invention relates to electric resistance elements and to methods of manufacturing same and has for its object in a technically simpler way to produce a reliable welded joint between shaped sintered bodies which have a content of at least 20% by volume of electrically conductive particles, and, for this operation, to make use of the electric conductivity of the material.

In an element according to the invention the sintered bodies are joined by an electric resistance butt welding operation and are built-up at least within that zone thereof termed the "weld zone," which is influenced by the welding operation, in part of a basic substance of crystal grains, which per se lack or have insufficient plastic deformability and ductility during the butt welding operation, and in part of an additional constituent uniformly distributed in the basic substance and having a softening temperature lower than that of the basic substance, the grain size of the basic substance being at most 20 micra in the welding zone and at most 10 micra beyond this zone.

The statements regarding the grain sizes are in each case understood to concern at least 70% by volume of the basic substance. It has been proved to be impossible, if the grain sizes are too large, to cause the deformations described below, being necessary for reducing the invention into practice. If the grain sizes are excessive the risk is run that there will be ruptures in the weld zone.

In this case, the proportion of basic substance in the material of the welding zone should be at least 20% and at most 99% by volume.

Various types of materials can come into question. In one such type of material the major proportion, suitably more than 65% by volume, of the basic substance consists of $MoSi_2$. In another type of material the basic substance consists of at least 25% by volume of $MoSi_2$ and at most 75% by volume of $Al_2O_3$. The proportion of the aluminium oxide which in the sintering process may combine with the additional constituent is not included in the last-mentioned percentage. Also other substances may, in a manner known per se, be included in the basic substance for modifying its properties, such as SiC, BtO, heat resistant silicides other than $MoSi_2$, borides, and aluminides.

The additional constituent consists preferably of a vitreous substance having a melting point lower than 1720° C. Suitable vitreous substances are those which contain between 60% and 100% $SiO_2$ and a balance of one or more oxides of the following elements: Na, K, Ca, Mg, B, Al and Ba. The vitreous substance may thus consist of solely $SiO_2$ having a melting point of about 1720° C.

A resistance element as manufactured in accordance with the invention may comprise a rod-like incandescent-zone body, or heating section, and, butt welded thereto, rod-like terminal-end conductors, or terminal sections, of a cross-sectional area larger than that of the heating section but reduced at the welded joint to substantially the area of the heating section, the area increase caused by the upset of the weld being less than 40% of the cross-sectional area of the heating section of the element.

In the production of a resistance element according to the invention one starts with at least two sintered form bodies. According to the invention these bodies are joined or integrated, by butt welding by the combined steps of composing the bodies, at least, within the zones thereof influenced by the welding operation, of a basic substance of electrically conductive crystal grains which, per se, are lacking or have an insufficient degree of plasticity at the butt welding temperature, and an additional constituent uniformly distributed among the grains of the basic substance and having a lower softening temperature than that of the basic substance and make the body plastically deformable and ductile at the butt welding temperature, and, after sintering the form bodies into an approximately non-porous state, forcing the form bodies against each other while heating the same by electric current flowing through said bodies.

Obviously, it would not be necessary that all of the grains within the basic substance be electrically conductive; it has been found, however, that the volume of conductive grains should exceed 20% by volume of the combined material to cause the latter to be electrically conductive. In this case the additional constituent should consist of components of such a nature that, when heated during the butt welding operation, they will form a vitreous material having a low melting point, preferably lower than 1500° C. The additional constituent has the effect of causing the material—at least in the welding zone—to exhibit increased ductility and plastic deformability in the butt welding operation. The grain size of the basic substance also increases so as to become at most 20 micra within the finished welding zone, whereas the same is at most 10 micra outside this zone. When the butt welded joint is completed, and the element is subsequently subject to heating during a fairly long time, a certain ageing will take place which reduces the deformability and ductility of the material.

Figure 6:
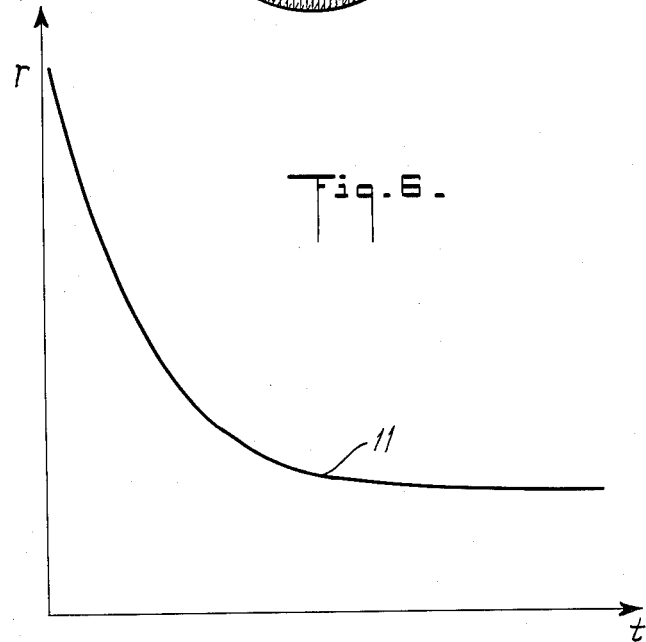
Figure 7:
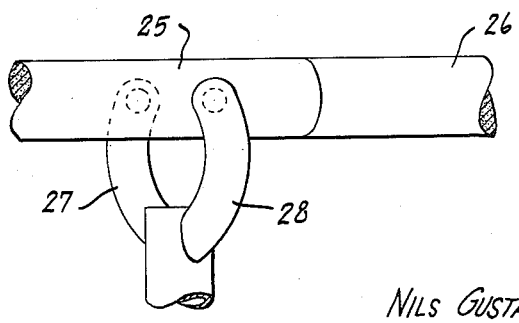
Figure 8:
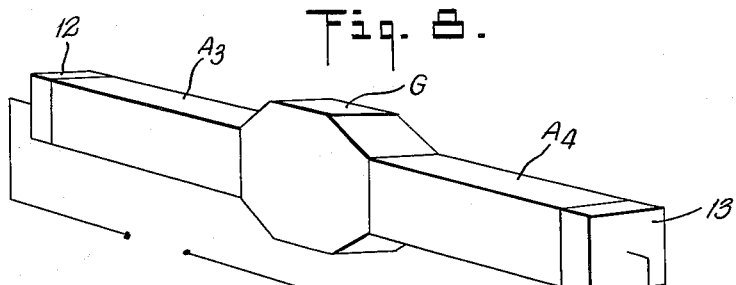
Figure 9:
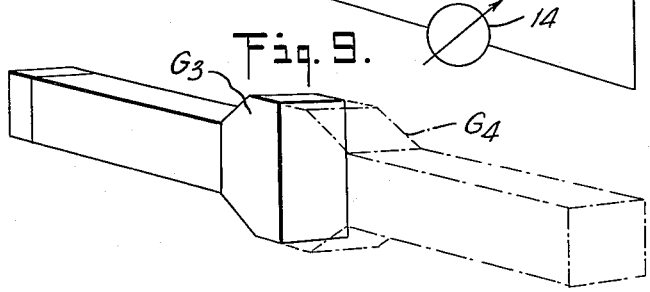
Figure 10:
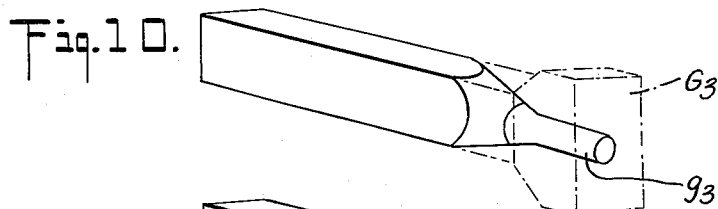
Figure 11:
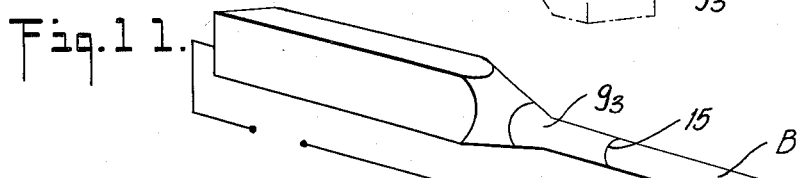
Figure 12:
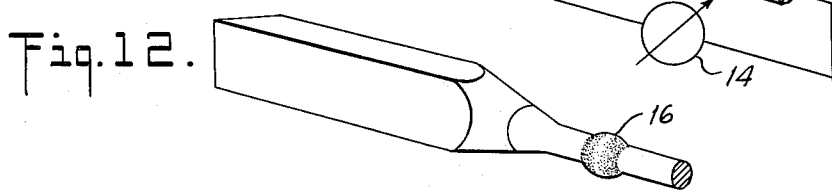

The invention will now be described more in detail with reference to the accompanying drawings, in which:

FIG. 1 is a diagrammatic showing of an electric resistance element manufactured in accordance with the invention, FIG. 2 a fragmentary view of two bodies to be joined by butt welding, FIG. 3 an illustration of various details of a butt welded joint, FIG. 4 a diagrammatic showing of a butt welding apparatus, FIG. 5 a cross-section through a deficient butt welded joint, FIG. 6 a graphic representation, FIG. 7 an illustration of a detail arrangement used in preparing the form bodies to be butt welded, FIGS. 8 and 9 a showing of two stages in the preparation of the terminal end portion of a resistance element, FIGS. 10 to 12 an illustration of the butt welding operation, and FIGS. 13 and 14 a showing of various steps of a different embodiment of the butt welding operation.

The initial materials, or material masses, which primarily may come into consideration for the formation of the various parts or sections of the resistance element, and which will be discussed hereinafter, can be classified as belonging to any one of the three following types.

I. A powder mixture consisting of 95% $MoSi_2$ plus 5% by weight of the additional constituent. The latter may consist of 25% $Al_2O_3$, 65% $SiO_2$ and a vitrifying substance, such as one or more oxides of the elements Na, K, Ca, Mg, B, Al and Ba. By sintering these materials an electrically conductive body will result.

II. 80% by weight of $MoSi_2$, 15% $Al_2O_3$ and 5% of the additional constituent having a composition as stated under I above. The sintered body produced from this powder mixture has an electrical resistivity substantially twice that of a body produced from the material according to point I above.

III. 60% $MoSi_2$, 35% $Al_2O_3$, and 5% of the additional constituent as stated under I. The body produced from this mixture has an electrical resistivity about four times that of the body produced from the material according to I.

From these materials, it is preferred to use either of types I and II for producing the terminal end sections of the resistance element, whereas all three types may be used as a material for producing the heating section. However, as regards the welding operation specifically, the only portion of the bodies which is of importance to this operation is that which is influenced thereby within the so-called weld zone.

The resistance element shown in FIG. 1 comprises two terminal end sections $A_1$, $A_2$, having a diameter of, for instance, 13 mm. and of which the portions $C_1$, $C_2$ facing the heating section proper B are tapered towards and united with this heating section B by butt welded joints $F_1$ and $F_2$. As diagrammatically illustrated in the drawing, the portions about each welded joint have been caused to expand somewhat radially due to the upsetting action, and the associated welding zones $G_1$, $G_2$ substantially comprise those upset portions. For example, with a diameter of the heating section B of 6 mm., the axial length of each such weld zone may be estimated to range between 5 and 10 mm.

FIG. 2 shows more in detail the formation of the junction portion $C_1$. The latter may suitably be mechanically reduced along a distance H of, for instance, 20 mm. and a radius R of, for instance, 70 mm. so as to have a diameter $d_1$ which should be substantially equal to the diameter $d_2$ of the heating section. However, these diameters should not differ from each other by an amount greater than that which is determined by the condition that, before the welding operation, the ratio of the cross-sectional area of the terminal end section to that of the heating section should range between 0.94 and 1.04. As a consequence of the upsetting action, as shown in FIG. 3, the diameter of the welded zone will be increased to a value $d_3$, and if the butt welding operation has taken place properly, the maximum area increase of the welded zone should range between 25% and 40%.

FIG. 4 illustrates apparatus for carrying out the butt welding operation, said apparatus comprising two clamping jaws 1 and 2 and, between these jaws, electric contact elements 3 and 4 adapted to be supplied with current through cables 5 and 6. A glove or socket 7 is provided with a supply conduit 8 for a neutral gas, such as argon, for example. The terminal end section $A_1$ is adjusted into alignment with the heating section B so as to cause their ends $G_1$ and $G_2$ to meet within the glove or socket 7.

It is of importance that, before the welding operation, the abutting faces $E_1$ and $E_2$ should be ground to be perfectly plane in order to obtain a maximum uniformity of upsetting in the compression. Further, before the upsetting operation, the welding zones $G_1$ and $G_2$ should have a constant diameter along a length of about 10 mm. from the abutting faces $E_1$ and $E_2$. Practically suitable dimensions are, for example, $d_1=d_2=6$ mm., and $d_1=13$ mm. The ratio of the electrical resistances per unit length of the sections $A_1$ and B thus will be $6^2/13^2$, i.e. equal to 0.21. In the present instance the terminal end sections and the heating section may be made of one and the same material.

During the welding operation the welding current is controlled by means of an adjustable transformer. It is of importance that a shielding gas flow of a suitable rate be maintained, and this rate of gas flow should be sufficient to displace the ambient air from the welding region, however, without being so heavy as to cause turbulence within the glove or socket 7 which might incur that the gas-stream would induce ambient air from the sides. In the apparatus shown and used a rate of gas flow of 14 to 15 litres per minute has been found to be most suitable. It is to be noted in this respect that if air is given access to the welding surfaces, the adhesion of the welded joint will, as a rule, be deficient. The pressure applied between the parts to be welded together is initially relatively moderate and is increased after the material has become ductile over the whole cross-sectional area. This increased pressure is maintained during 30 to 60 seconds. After the degree of upset has reached a suitable value, as stated above, the welding current is switched off while maintaining the final upsetting mechanical pressure. It should be observed here, that the degree of upsetting is critical and if the deformation is too great internal cracks or fissures within the upset portion may occur which, although they would not reach the external surface, nevertheless would deteriorate the mechanical strength of the weld. The degree of upsetting being too small this may result in remaining thin films of oxides or phases of a lower content of silicon than that of $MoSi_2$. The presence of such intermediate layers with characteristics differing from those of the basic material, such as a different coefficient of thermal expansion, will of course contribute to a weakening of the welded joint. With a normal degree of upsetting action, giving rise to a maximum area increase at the welded joint ranging between 25% and 40%, on the other hand, a re-baking or interfusion will take place causing such films to be shattered and admixed with the basic material. If, further, the upsetting is performed too rapidly, this will result in the same kind of internal cracking as was described with reference to the case of the degree of the upsetting being too high.

The area increase involved in the welding operation is of advantage from the point of view of strength, in that the mechanical strength at the welded joint will be increased, the welding region being otherwise always somewhat weaker than the remainder of the element, in spite of the obtainment of a sound weld with good interfusion.

It has been found that the result of the butt welding is highly dependent on the course of the preceding sintering of the bodies to be welded as regards the height and duration of the temperature applied in the sintering.

It is important, therefore, that, before the butt welding operation, the welding zones, at least, of the form bodies are sintered during a length of time and at a temperature which are, on one hand, sufficient to render the compacts approximately non-porous, but are, on the other hand, delimited in such a way that, within the associated welding zone, at least, the material will maintain after its sintering a plastic deformability while heated during a length of time sufficient for enabling the butt welding operation to be completed. It may be mentioned for guidance, that it has been found with an initial material which contains, at least, within the intended welding zone, at least about 90% $MoSi_2$ and an oxide component which may be expected in the finished bodies to consist of a glass containing $SiO_2$, $Al_2O_3$ and a fluxing agent and forming a content of 5 to 10% by weight of the material, that the compacts should be sintered in hydrogen gas for a time of up to 10 hours at a temperature ranging between 950° C. and 1450° C., and then should be sintered in air for one hour, at most, at a surface temperature of 1500° C. to 1650° C. The actual time and temperature to be employed within these limits should be selected in relation to the diameter or cross-sectional area of the bodies or compacts. As a matter of fact, if this diameter is less than approximately 10 mm., for instance 6 mm. which is usual value for the heating section, then the suitability of the body for butt welding purposes would not materially change as a result of a certain variation of the sintering time and temperature within the above-stated limit values. However, as regards the terminal end sections, the diameter of which will frequently amount to more than 10 mm., for instance 13 mm., conditions will be more critical, and one will be confined to a more restricted range; thus, with bodies of a kind containing at least 80% $MoSi_2$, the material of their welding zones, at least, should be sintered at a temperature of 1320° C. in hydrogen gas for a time of 15 to 20 minutes, and then be subjected to final sintering in air by passing an electric current therethrough during 5 minutes at a surface temperature of 1500° C.

FIG. 5 illustrates the surface of fracture of a weld which has been made by subjecting the material of a terminal end section to an excessive temperature for an excessive length of time before welding. The dotted surface 9 thereof corresponds to an ordinary surface of fracture where the weld is sound, whereas the surrounding sectioned surface 10 represents a portion where the welding action has not been successful, and the original ground end face is exposed in its initial condition.

Thus it is of the uttermost importance, that the sintering process during the final sintering procedure be controlled which is feasible since this final sintering is carried out by the aid of an electric current passed through the body or compact. FIG. 7 illustrates a graph in which the ordinates represent electrical resistivity $r$ and the abscissae represent the time $t$ of a sintering process. With the lapse of time, the sintering action causes the pores of the material to be more and more reduced whereby the conductivity increases and the resistivity $r$, accordingly, diminishes. As an approximate point 11 is reached, the material will be almost non-porous, and the sintering should then be interrupted at once and the material allowed to cool down preparatory to the butt welding operation. As a matter of fact, if the final sintering be continued beyond this point certain ageing phenomena will occur causing the deformability or ductility of the material to gradually diminish, so that, as stated hereinbefore, the butt welding operation will be gradually more difficult to perform.

Where the production of an element is concerned of which the terminal end portions are larger in diameter than the heating section, as shown in FIGS. 1, 2 and 3, it is particularly important to observe that the welding zones $G_1$ of the terminal end sections are made of a material which can be expected, after the welding operation, to possess a coefficient of thermal expansion substantially the same as that of the material of the mating welding zones $G_2$ of the heating section, and that the terminal end sections be sintered into a substantial non-porous state, and be shaped, suitably by mechanical working, into a cross-sectional area substantially equal to that of the heating section, and that the terminal end sections are butt welded to the heating section. The mechanically worked portions of the terminal end sections due to the grinding thereof, will lack the protective skin or coating of quartz glass, formed on sintered bodies constituted to their major portion of $MoSi_2$. Therefore, these portions should be subjected to sintering subsequent to the butt welding operation so as to obtain such a protective coating which will, as a rule, be obtained after a short time of service use of the resistance element at a high temperature.

As the protective coating is formed only if the oxidizing sintering takes place at about 1200° C. or higher and, if this temperature is to be obtained at the ground surfaces of the cool terminal sections through heat conduction from the hot heating section, the grinding must be made in such a way that the desired temperature is obtained on the ground surfaces. The grinding should thus be made along a distance of at most 25 mm. on the terminal section.

It is previously known per se to produce the resistance elements powder-metallurgically by sintering the same from two different powder masses. When such sintered bodies are to be used as terminal sections for the purpose here contemplated, the welding zones of the bodies facing the heating zone should have a composition similar to that of the welding zones of the heating section (or incandescent zone), after which the bodies or compacts forming the terminal end sections and heating section are sintered individually by passing electric current therethrough, and the welding zones of the terminal end sections and heating section are then butt welded by means of electric current.

This procedure can be carried into effect in different ways. FIG. 8 illustrates one such method by way of example. In this case, the two terminal end bodies are compacted from two different powder masses, such as of type I and II, that of type II being intended to form the welding zones G, and that of type I the cold zones $A_3$ and $A_4$, so as to produce an integral, or unitary, form body or compact $A_3$–G–$A_4$ forming a terminal section blank. Thus the cross-sectional area of this blank will vary along the length of the blank in such a way in dependence of the resistivity of the material present at the cross-section concerned that the desired sintering temperature will obtain. This blank compact may be finally sintered by applying two electrodes 12, 13 thereto and connecting these electrodes to a source of electric current (not shown) through an ammeter 14. The passage of the current will cause the body to be heated approximately uniformly, or according to a desired distribution, and the sintering is continued until it is ascertained, by the reading of the ammeter 14, that a nearly non-porous state has been attained, after which the intermediate portion G (see FIG. 9) is cut off into two welding zones $G_3$ and $G_4$ which (see FIG. 10) are reduced by grinding so as to form the narrow welding zone $g_3$ having a diameter substantially equal to that of the heating section B. Butt welding can then be undertaken at 15 by passing an electric resistance heating current therethrough. After completing the welding operation proper the material has been subjected to an upsetting pressure causing an upset or bead 16 to form about the welded joint.

The procedure could instead be carried out in the following manner, as illustrated in FIG. 13. The form body there shown consists of a reduced intermediate portion $A_5$–$A_6$ made of a terminal end section material, such as of type I, and two relatively enlarged end portions $G_5$–$G_6$ made of a heating section material, such as of type II. This form body is initially produced by compacting the powder mixtures and sintering the compact at a temperature which enables the compact to be handled. Thereafter preferably water-cooled contacts are connected at 17 and 18, and sintering is undertaken in a shielding atmosphere at a sufficiently high temperature to render the compact low-porous and mechanically durable except at its extreme ends. If the heating section material at $G_5$ and $G_6$ is to have a sintering temperature higher than that of the terminal section material at $A_5$ and $A_6$, then the ratio of the cross-sectional area of the intermediate portion $A_5$–$A_6$ to that of the end portions $G_5$ and $G_6$ should exceed the ratio of the electric resistivity of the heating section material to that of the terminal section material. If, conversely, the sintering temperature of the terminal section material is to be higher, the reverse condition applies. After completing the final sintering operation, the form body is cut off at 19 into two equal parts, and the dotted regions at the ends are ground away.

In connection with the production of the form body $G_5$–$A_5$–$A_6$–$G_6$ it may be desirable to establish diffuse or continuous (or interfused) junctions between the heating section material in $G_5$ and $G_6$ and the terminal section material in $A_5$, $A_6$, these interfused junctions extending along predetermined lengths 20 and 21, respectively. This feature will be particularly advantageous and desirable where the difference in sintering temperatures between the heating section material and the terminal section material is great. The terminal section part $G_5$–$A_5$ could possibly be combined with an extended terminal end section 22 and a heating section B in a manner corresponding to that described hereinbefore. The butt welding operation can readily take place since the material on either sides of the welding localities 23 and 24 is the same, or substantially the same. The remaining enlargement or upset 25 will cause the high temperature created in the heating section B to diminish sufficiently not to destroy the terminal section material $A_5$ in the event that the latter should have a resistance to heat lower than that of the heating section material.

In the manner above described it is thus feasible to produce elements having different compositions in heating section and terminal sections. The cooler portions of the terminal sections may be advantageously made in metal which often is cheaper and more ductile than, for instance, $MoSi_2$. Such a metal may be a known heat resistant oxidation-proof alloy or, for instance, molybdenum protected by surface siliciding. It is also possible to produce combinations of SiC and $MoSi_2$ for the heating zone and the terminal sections in resistance elements according to the present invention.

It may be mentioned by way of example that the blank of FIG. 13 can be formed by press-moulding from the two powder mixtures into the following dimensions: a length of 500 mm. and a cross-section which is 6 by 6 mm. throughout the reduced intermediate portion, and 6 by 15 mm. along the enlarged end portions. The length of the intermediate portion is 2 by 210 mm., and the length of each end portion is 40 mm. The heating section rod B may be an extruded rod of circular section having a length of 1200 mm. and a diameter of 6 mm.

It is possible also to integrate sintered bodies of differently composed materials directly by butt welding, provided that after the welding operation they will exhibit equal coefficients of thermal expansion. On the other hand, they may exhibit different electric resistivities. Therefore, in connection with the butt welding operation one provides for separate cooling of the welding zone possessing the higher electrical resistivity value, i.e. for the heating section, as a rule, thereby to render the two welding zones equal in softness, or ductility, so as to be upset to equal degrees as a result of the pressure application in the butt welding operation. Such separate cooling, as shown in FIG. 7, may be effected by directing a blast of an inert gas, for instance argon, onto the welding zone 25 of the heating section, whereas the welding zone 26 of the terminal end section is not subjected to such cooling. The cooling medium can be supplied through separate jets 27 and 28 which are introduced into the interior of the socket or glove 7 shown in FIG. 4.

Finally, applicant has found that the vitrifying substance to be incorporated in or to constitute the additional consituent is preferably a finely divided clay of the montmorillonite group. In producing the sintered body the following steps are preferably taken:

Finely divided molybdenum disilicide is admixed with about 0.2 to 20% by weight of the finely divided plastic clay, the mixture sintered in the absence of oxygen at about 1000 to 1400° C., thereby producing a presintered porous material, and then the sintered material is heated in the presence of oxygen at a temperature of 1400 to 1700° C. at which the clay is melted whereby the resistance of the sintered body to oxidation, grain growth, creep and recrystallization is enhanced.

What is claimed is:

1. An article of manufacture composed of at least two rigid, hard preformed powder-metallurgically produced sintered bodies united with each other by an electric resistance butt weld and each having a content of at least 20% by volume of electrically conductive particles of the group consisting of refractory silicides, borides and aluminides, the zone of the article comprising said weld being formed in part by a basic substance composed of crystal grains of the class consisting of refractory silicides, borides, aluminides and oxides and a vitreous substance uniformly distributed in the basic substance, said basic substance having per se insufficient plastic deformability and ductility for butt welding, the grain size of the basic susbtance being not greater than 20 microns in the welding zone and not greater than 10 microns beyond said zone.

2. An article of manufacture as described in claim 1 in which the basic substance forms at least 20% by volume and not more than 99% by volume of the material in the welding zone.

3. An article of manufacture as described in claim 1 in which at least 65% of the basic substance consists of molybdenum disilicide.

4. An article of manufacture as described in claim 1 that is a resistance element in which the basic substance consists of at least 25% by volume of $MoSi_2$ and not more than 75% by volume of $Al_2O_3$.

5. An article of manufacture as described in claim 1 that is a resistance element in which the vitreous substance constitutes from 5 to 25% by volume of the material in the weld zone.

6. An article of manufacture as described in claim 1 that is a resistance element in which the vitreous substance has a melting point lower than 1720° C.

7. An article of manufacture as described in claim 1 that is a resistance element in which the element comprises a rod-like heating section and butt welded thereto, rod-like terminal end conductors having cross sectional areas larger than that of said heating section but reduced at the welded joint to substantially the area of said heating section, the area increase caused by the upset of the weld being less than 40% of the area of the heating section of the element.

8. A method of butt welding two previously formed sintered rigid hard, substantially nonporous bodies produced by powder-metallurgy and effective to unite said bodies regardless of length, each of said bodies having at least 20% by volume of electrically conductive particles of the group consisting of refractory silicides, borides and aluminides, and each of said bodies consisting essentially of a basic substance of crystal grains of the class consisting of refractory silicides, borides, aluminides and oxides and a vitreous substance, said vitreous substance being uniformly distributed in the basic substance, the grain size of the basic substance being not more than 10 microns, which comprises forcing said formed bodies against each other while heating the same by passing an electric current through said bodies thereby to form a strong bond between the bodies at the surfaces of contact.

9. A method as described in claim 8 in which the vitreous substance is glass having a melting point below 1500° C.

10. A method as described in claim 8 in which each of the preformed bodies are presintered for a time and at a temperature which are sufficient to render the article approximately nonporous but retain on the other hand a sufficient degree of plastic deformability during heating to permit the butt welding operation to take place while still retaining plastic deformability during said butt welding operation.

11. The method as described in claim 10 wherein the preformed bodies are made by sintering in an atmosphere of hydrogen gas for a time up to 10 hours at a temperature range between 950° C. to 1450° C. and thereafter sintering said preformed bodies in air for not more than one hour at a surface temperature of 1500° C. to 1650° C., the preformed bodies containing not less than 80% $MoSi_2$ in the portions to be butt welded and an oxide component capable of producing in the finished articles a glass containing $SiO_2$, aluminum oxide and a fluxing agent, said glass constituting 5 to 10% by weight of the material, and thereafter butt welding said formed bodies.

12. A method as described in claim 11 in which the material adjacent the surface to be welded is presintered at a temperature of 1320° C. in hydrogen gas for a time of 15 to 20 minutes and is then subjected to final sintering in air by passing an electric current therethrough for 5 minutes at a surface temperature of 1500° C.

13. The method of claim 8 wherein the one of said bodies is a terminal section and the other is a heating section, the type of basic substance and the type of vitreous substance being selected so that said terminal section and said heating section will have substantially the same coefficient of thermal expansion after welding at the mating welding zones, said terminal section originally having a larger cross sectional area than said heating section, sintering each of said bodies before welding to a substantially nonporous state retaining some of its plastic properties, and shaping said terminal section to a cross section substantially equal to that of the welding zone of the heating section and thereafter butt welding the two bodies together.

14. The method of claim 13 wherein the basic substance is $MoSi_2$ and after shaping the terminal section to fit the heating section, the terminal section is heated in an oxidizing atmosphere after the butt welding operation so as to cause the formation of a protective coating of $SiO_2$ thereon through oxidation of $MoSi_2$ present in the body.

15. The method of claim 13 in which the ratio of the cross sectional area of the welding zones of the terminal section to that of the welding zone of the heating section ranges between 0.94 and 1.04.

16. The method of claim 8 in which the temperature and the pressure between the bodies are maintained during the butt welding operation and the time of butt welding operation is such as to cause an increase of the cross sections of the welding zones due to the upset formed by the butt welding within the range of 25% to 40%.

17. The method of claim 8 in which the butt welding is carried out in an atmosphere of inert gas.

18. The method of claim 8 in which the butt welding is carried out in an atmosphere of argon.

19. The method of claim 8 wherein one of said bodies is a terminal section and the other is a heating section, the terminal section body being produced powder-metallurgically by sintering compacts of said basic substance and said vitreous substance of such a nature as to cause the welding zone facing the heating section body to be of a composition similar to that of the mating welding zone of the heating section, sintering each of said bodies before welding to a substantially nonporous compact retaining some of its plastic properties by passing electric current therethrough and thereafter butt welding the mating welding zones of the terminal section and the heating section by passing electric current therethrough.

20. The method of claim 19 wherein two terminal section bodies are produced by compacting two different powder masses of which one is to form the welding zones, said compact bodies having an intermediate portion and two end portions, one of said powder masses forming said intermediate portion and the other powder mass forming said end portions, one of said powder masses being adapted to form the welding zones of the two terminal sections, the cross-sectional area of the bodies varying along the bodies in coordination with the electric resistivity of the material present at the cross section concerned so that the desired sintering temperature will be obtained.

21. The method of claim 8 wherein the portions of the bodies adjacent the butt weld are of different composition but substantially equal in cross-sectional area, and wherein the bodies are subjected to different cooling actions so as to obtain substantially equal softness characteristics on both sides of the weld.

22. The method of claim 10 wherein the preformed bodies are made by sintering in an inert atmosphere at a temperature range between 950° and 1450° C. and thereafter sintering said preformed bodies in an oxygen-containing atmosphere at a surface temperature of 1500 to 1650° C., the preformed bodies containing not less than 80% $MoSi_2$ in the portions to be butt welded, and a finely-divided clay of the montmorillonite group in an amount sufficient to produce in the final product a glass containing 5 to 10% by weight of the material, and thereafter butt welding said preformed bodies.

References Cited in the file of this patent

UNITED STATES PATENTS

| | | |
|---|---|---|
| 1,867,028 | Phelps | July 12, 1932 |
| 1,896,853 | Taylor | Feb. 7, 1933 |
| 2,175,899 | Kelly | Oct. 10, 1939 |
| 2,413,043 | Ganci | Dec. 24, 1946 |
| 2,622,304 | Coffer | Dec. 23, 1952 |
| 2,770,029 | Veltz | Nov. 13, 1956 |
| 2,857,297 | Moore et al. | Oct. 21, 1958 |

FOREIGN PATENTS

| | | |
|---|---|---|
| 776,970 | Great Britain | June 12, 1957 |

UNITED STATES PATENT OFFICE
CERTIFICATE OF CORRECTION

Patent No. 2,993,111                      July 18, 1961

Nils Gustav Schrewelius et al.

It is hereby certified that error appears in the above numbered patent requiring correction and that the said Letters Patent should read as corrected below.

Column 2, line 1, for "BtO" read -- BeO --; column 4, line 7, for "$d_1$", second occurrence, read -- $D_1$ --; column 10, line 22, before "bodies" insert -- compact --.

Signed and sealed this 21st day of November 1961.

(SEAL)
Attest:

ERNEST W. SWIDER                            DAVID L. LADD
Attesting Officer                                Commissioner of Patents